(12) United States Patent
Laurent

(10) Patent No.: US 6,792,567 B2
(45) Date of Patent: Sep. 14, 2004

(54) SYSTEM AND METHOD FOR CORRECTING SOFT ERRORS IN RANDOM ACCESS MEMORY DEVICES

(75) Inventor: Duane Giles Laurent, Lewisville, TX (US)

(73) Assignee: STMicroelectronics, Inc., Carrollton, TX (US)

(*) Notice: Subject to any disclaimer, the term of this patent is extended or adjusted under 35 U.S.C. 154(b) by 463 days.

(21) Appl. No.: 09/846,579

(22) Filed: Apr. 30, 2001

(65) Prior Publication Data

US 2002/0162069 A1 Oct. 31, 2002

(51) Int. Cl.[7] .............................................. G11C 29/00
(52) U.S. Cl. ...................... 714/763; 714/768; 714/773
(58) Field of Search ................................ 714/763–768, 714/772–773

(56) References Cited

U.S. PATENT DOCUMENTS

| | | | |
|---|---|---|---|
| 4,964,130 A | | 10/1990 | Bowden, III et al. |
| 5,778,007 A | * | 7/1998 | Thomann et al. ........... 714/763 |
| 6,101,614 A | | 8/2000 | Gonzales et al. |
| 2003/0009721 A1 | * | 1/2003 | Hsu et al. ................... 714/773 |

FOREIGN PATENT DOCUMENTS

| | | | | |
|---|---|---|---|---|
| EP | 0 717 357 | | 6/1996 | |
| WO | WO 96/37840 | | 11/1996 | |
| WO | WO 9829811 A1 | * | 7/1998 | ........... G06F/11/08 |

OTHER PUBLICATIONS

IBM Technical Disclosure Bulletin, Jun. 1981, vol. 24, No. 1B, pp. 485–488.*
Mehrdad Heshami et al., A 250–Mhz Skewed–Clock Pipelined Data Buffer, Mar. 1996, IEEE Journal of Solid–State Circuits, vol. 31, No. 3, pp. 376–383.*
European Search Report, EP 02252819, dated Feb. 18, 2004.

* cited by examiner

*Primary Examiner*—R. Stephen Dildine
(74) *Attorney, Agent, or Firm*—Lisa K. Jorgenson; Andre Szuwalski

(57) ABSTRACT

A circuit and method are disclosed for reducing soft errors in dynamic memory devices using error checking and correcting. In an exemplary embodiment, a memory device includes a dual port memory having a first port for externally-initiated memory access operations and a second port for handling memory access operations associated with error checking and error correction operations. An error module, coupled to the second port of the dual port memory, performs an error checking operation on words read from the dual port memory. An error controller, coupled to the error module, controls the error module to perform error check operations on each word sequentially read from the dual port memory through the second port thereof. The error checking is performed substantially in parallel with externally-initiated memory access operations performed using the first port of the dual port memory. The error module may also generate a corrected word for a word that is detected by the error module as having a correctable error. The error controller may replace in the dual port memory the word having the correctable error with the corrected word.

28 Claims, 2 Drawing Sheets

SYSTEM AND METHOD FOR CORRECTING SOFT ERRORS IN RANDOM ACCESS MEMORY DEVICES

BACKGROUND OF THE INVENTION

1. Technical Field of the Invention

The present invention relates to reducing errors in memory devices, and particularly to reducing soft errors in dynamic memory devices using error checking and correcting circuitry.

2. Description of the Related Art

Dynamic random access memory (DRAM) devices are known to store a data bit value in a memory cell by maintaining a charge stored on a capacitor. This technique for maintaining data makes DRAM devices more susceptible to soft errors caused by alpha particle hits or weak memory cells. Soft errors are seen to discharge the charge stored in a memory cell capacitor, resulting in a logic high data bit becoming a logic low data bit.

In applications where data integrity is critically important, systems including DRAMs often utilize error checking and correcting (ECC) capability. ECC has been previously implemented in software executed by a memory controller associated with the DRAM device, and in hardware within the DRAM device itself. With respect to the latter, ECC capability is implemented as part of the row access cycle of a memory access operation or as part of the column access cycle thereof. When ECC capability is implemented in the row access cycle, ECC operates on an entire row of data, such as 1024 bits, which improves efficiency with reduced silicon area. ECC operations in row access cycles are substantially hidden from normal memory read/write operations because of the prolonged time period for the row access cycle.

When ECC capability is implemented in the column access cycle of a memory read/write operation, efficiency is reduced due to the ECC operations being performed on shorter data words. The size of the ECC circuitry is less than when performed during the row access cycle. More importantly, the ECC circuitry and/or operation is in the critical path of a memory access operation. A 3 ns delay overhead for performing an ECC operation, for example, would render ineffective a DRAM device having a required 5 ns access time. However, the need to reduce cost and/or silicon size results in a general preference for performing error checking and correcting during the column access cycle of a memory read/write operation.

Based upon the foregoing, there is a need for more efficiently reducing soft errors in a memory device, such as a DRAM device, with relatively little impact on silicon space and DRAM performance.

SUMMARY OF THE INVENTION

Embodiments of the present invention overcome shortcomings in prior memory devices and satisfy a significant need for a memory device having reduced susceptibility to soft errors. In accordance with an exemplary embodiment, a memory device includes a dual port memory having a first port for externally initiated memory access operations and a second port for performing ECC operations. The dual port memory is capable of performing memory operations on words, with each word including data bits and error code bits. An error module, coupled to the second port of the dual port memory, performs an error checking operation on words read from the dual port memory via the second port thereof. An error controller, coupled to the error module, controls the error module to detect errors in each word sequentially read from the dual port memory via the second port thereof. The error checking is performed substantially in parallel with externally-initiated memory access operations performed using the first port of the dual port memory. The error module may also generate a corrected word based upon a word that is detected as having a correctable error. The error controller may replace the word having the correctable error with the corrected word in the dual port memory.

An operation of the memory device, in accordance with an exemplary embodiment of the present invention, includes performing externally-initiated memory access operations on a memory device via the first port thereof, and performing, substantially in parallel with performing externally-initiated memory access operations, error checking and correcting operations on words stored in the memory device via a second port thereof.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PREFERRED EXEMPLARY EMBODIMENTS

The present invention will now be described more fully hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough and complete, and will fully convey the scope of the invention to those skilled in the art.

Figure 1:
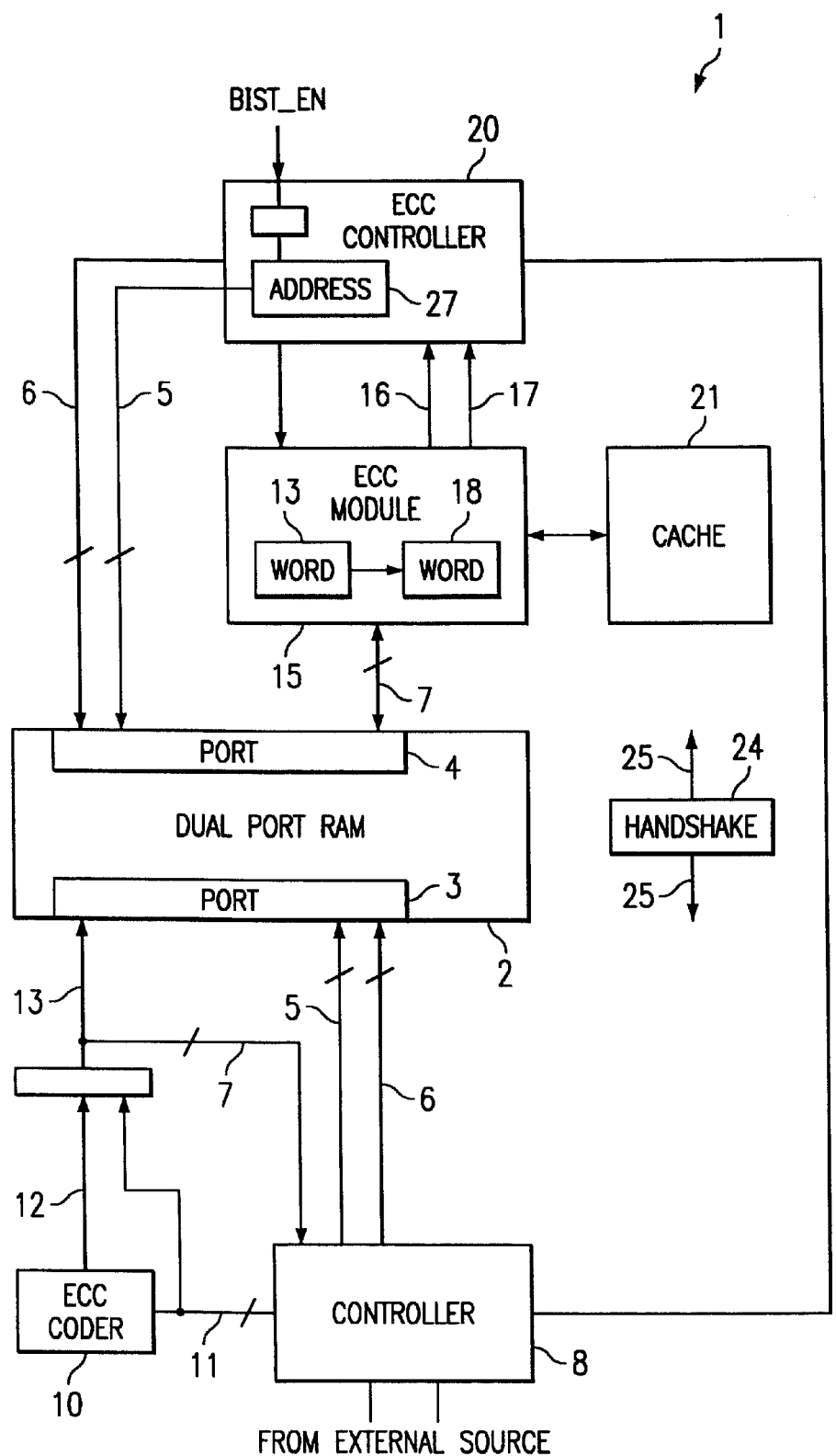
FIG. 1 is a block diagram of a memory device according to an exemplary embodiment of the present invention.
Figure 2:
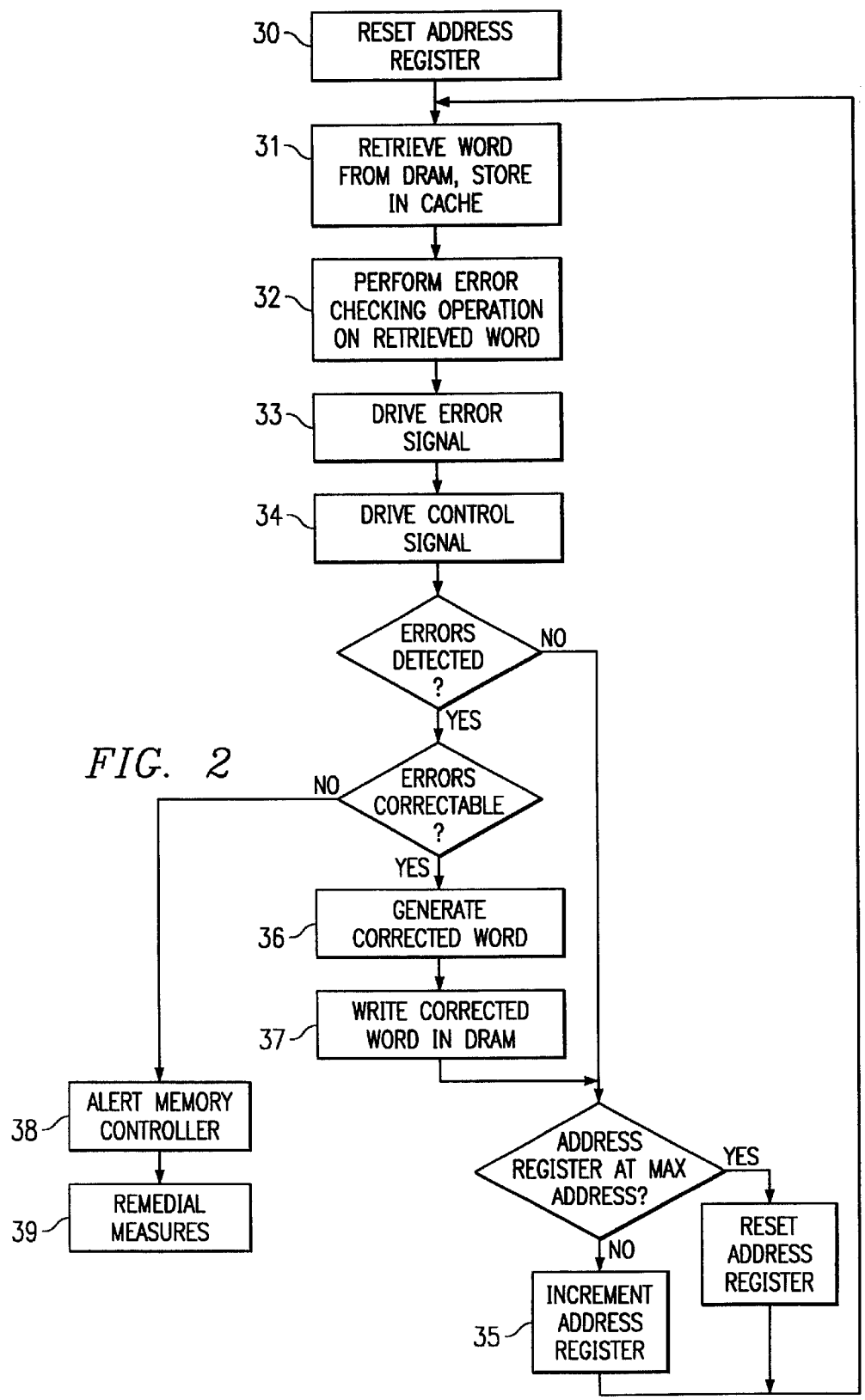
FIG. 2 is a flow chart illustrating an operation of the memory device of FIG. 1.

Referring to FIGS. 1–2, there is shown a memory device 1 according to an exemplary embodiment of the present invention. Memory device 1 utilizes error checking and correcting (ECC) to reduce the occurrence of soft errors. The ECC operations are performed substantially simultaneously with externally-initiated memory access operations (i.e., read/write operations to memory device 1 initiated by a source external to memory device 1 during normal operation within a system).

Memory device 1 includes a dynamic random access memory (DRAM) 2. The DRAM 2 may be a dual port memory so that access to stored data may be from two ports. In accordance with the exemplary embodiment of the present invention, externally-initiated memory access operations are performed using a first port 3 of DRAM 2. A second port 4 of DRAM 2 is utilized to perform ECC operations, as described in greater detail below. Each port of DRAM 2 receives an address input bus 5 and input control signals 6, such as a chip enable, read/write, row address strobe (RAS), column address strobe (CAS), etc., associated with conventional DRAMs. Each port of DRAM 2 further receives a single bidirectional input/output data bus 7 or separate data input and data output buses for unidirectional operation.

DRAM 2 will be described as receiving bidirectional input/output data buses 7 for reasons of simplicity. DRAM 2 is capable of storing words of parallel bits.

With respect to memory access operations initiated during normal operation by an external source, such as during a direct memory access (DMA), memory device 1 may include a memory controller 8 to facilitate the externally-initiated memory access operations. Memory controller 8 may provide address bus 5 and control signals 6 associated with first port 3, and otherwise perform as a conventional memory controller in facilitating externally-initiated memory access operations. A group of parallel data bits sent to memory device 1 are provided to DRAM 2 via memory controller 8. Memory controller 8 may be implemented as a microprocessor-based controller, but it is understood that memory controller 8 may be implemented in other ways as well.

Memory device 1 may further include an ECC encoder unit and/or circuitry 10 that receives each group of parallel data bits 11 to be stored in DRAM 2 and generates ECC code bits 12 therefor. The group of parallel data bits 11 and the code bits 12 corresponding thereto are combined to form a word 13. Each formed word 13 is provided to the first port 3 of DRAM 2 and stored in DRAM 2 during a memory write operation, as controlled by memory controller 8. In this way, each word 13 stored in DRAM 2 via first port 3 includes data bits 11 (provided by an external source) and ECC code bits 12.

It is understood that, alternatively, ECC code bits 12 may be generated externally to memory device 1. In this case, an entire word 13 is provided to memory device 1 (and DRAM 2, via first port 3) for storage therein. It is further understood that ECC code bits 12 may be generated by memory controller 8.

In the exemplary embodiment of the present invention, a DRAM 2 may be implemented as a single DRAM extended to include, with each group of data bits 11, ECC code bits 12 in word 13. Alternatively, DRAM 2 may be implemented as two DRAMs connected substantially in parallel, with a first DRAM holding the data bits 11 for each word 13 and a second DRAM holding the corresponding ECC code bits 12.

It is understood that the number of data bits 11 and code bits 12 in words 13 stored in DRAM 2 may vary depending upon a number of factors, such as the extent of error checking and correcting desired.

As stated above, second port 4 is utilized to perform ECC operations on words 13 stored in DRAM 2 so as to reduce the presence of soft errors. In accordance with the exemplary embodiment of the present invention, memory device 1 may include an ECC module or circuitry 15 capable of performing an error checking operation on a word 13. ECC module 15 generates an error signal 16 having a value indicating whether the last word 13 decoded and/or operated on by ECC module 15 contains at least one error. In addition, error module 15 may generate a correct signal 17 having a value indicative of whether one or more detected errors in a word 13 is correctable.

Error module 15 is also capable of automatically performing an error correction operation on words 13 determined to possess one or more correctable errors, and generating corrected words 18 based upon the words 13.

Memory device 1 further includes an ECC controller 20 which controls ECC module 15 and DRAM 2 so that each word 13 stored in DRAM 2 is regularly checked for errors and replaced with a corrected word, if necessary. In particular, controller 20 may provide to DRAM 2 an address bus 5 and memory control signals 6 for sequentially retrieving each word 13 stored in DRAM 2. Each retrieved word 13 is provided to ECC module 15 so that ECC operations may be performed thereon. Controller 20 is coupled to ECC module 15 to receive error signal 16 and correct signal 17 generated thereby. Based upon the values of error signal 16 and correct signal 17 generated during an ECC operation on a word 13 retrieved from DRAM 2, controller 20 may either initiate a memory write operation to store a corrected word in DRAM 2, alert memory controller 8 of an uncorrectable error being checked, or read another word 13 from DRAM 2 for testing. Controller 20 controls ECC module 15 and DRAM 2 so as to substantially continuously cycle through each memory location in DRAM 2. The particular sequence of operation of controller 20 will be described in greater detail below.

Controller 20 may be implemented as a state machine for generating the addressing and timing control signals for DRAM 2 and for responding to the results of an ECC operation by ECC module 15. It is understood, however, that controller 20 may be implemented with a processor using software for controlling DRAM 2 and ECC module 15 to perform ECC operations on words 13 stored in DRAM 2.

Memory device 1 may further include a cache 20 or other storage device for temporarily storing words 13 retrieved from DRAM 2 on which ECC operations are to be performed by ECC module 15. Cache 20 may be further and/or alternatively utilized for temporarily storing corrected words generated by ECC module 15 as a result of an error correction operation on a word 13 containing one or more correctable errors.

Memory device 1 may further include handshake circuitry 24 for monitoring the memory access operations performed by memory controller 8 and ECC controller 20, and generating handshake control signals 25 for arbitrating substantially simultaneous memory access operations directed to the same memory location in DRAM 2.

The operation of memory device 1 maintaining words 13 having reduced occurrences of soft errors will be described. Words are written to and read from DRAM 2 via first port 3 during normal memory access operations initiated externally to memory device 1. Externally-initiated write operations are performed and/or effectuated by memory controller 8. During each externally-initiated write operation, ECC encoder 10 generates ECC code bits 12 for each group of parallel data bits 11 to be stored in DRAM 2. Externally-initiated read operations are performed by memory controller 8 via first port 3 using conventional techniques.

The operation of ECC controller 20 and ECC module 15 will be described with reference to FIG. 2. Initially, ECC controller 20 sets an internal address register 27 (FIG. 1) to address location 0 at 30. ECC controller 20 then retrieves the word 13 stored in the location identified by address register 27. In doing so, ECC controller 20 generates control signals 6 and places the value stored in address register 27 on address bus 5. The retrieved word 13 is stored in cache 21 at 31 and is thereupon accessible by ECC module 15. ECC module 15 then performs an error checking operation at 32, indicates at 33 on error signal 16 whether one or more errors are detected in word 13, and indicates at 34 on correct signal 17 whether the detected one or more errors is correctable. In the event ECC module 15 detects no errors in word 13, ECC controller 20, by reading the value appearing on error signal 16, checks the value of address register 27 and increments at 35 address register 27 if the checked value does not correspond to the memory location having the highest address value. Otherwise, address register 27 is reset. Next, ECC controller 20 generates control signals 6 to perform another read operation from the location corresponding to the (incremented) value stored in address register 27.

In the event ECC module 15 detects one or more correctable errors, ECC module 15 automatically generates at 36 an error correction operation to generate a corrected word 18 corresponding to the word 13 and provides the corrected word 18 to ECC controller 20. ECC controller 20, by reading the value appearing on error signal 16 and correct signal 17, performs at 37 a write operation to write into DRAM 2 the corrected word 18 in the memory location identified by address register 27. In this way, the word 13 stored in DRAM 2 having the correctable error(s) is replaced by corrected word 18. Thereafter, address register 27 is selectively incremented at 35 or reset as described above. ECC controller 20 then generates control signals 6 to perform another read operation from the location corresponding to the incremented value stored in address register 27.

In the event ECC module 15 detects at least one uncorrectable error, correct signal 17 is driven to indicate the checking of the uncorrectable error. ECC controller 20, by reading the value appearing on correct signal 17, alerts memory controller 8 at 38 of the uncorrectable error condition. Memory controller 8 may then suspend operation or take appropriate remedial measures in response at 39.

It is understood that instead of initially resetting and thereafter incrementing address register 27, ECC controller 20 may alternatively initially set address register 27 to the highest address location in DRAM 2 and thereafter regularly decrement address register 27 in order to cycle through each memory location in DRAM 2.

As described above, ECC controller 20 sequences through the memory locations in DRAM 2 so that an ECC operation may be performed on the word 13 stored in each memory location. In the event that the maximum time period for performing the above-described ECC operations on each memory location in DRAM 2 is less than the refresh time period for refreshing DRAM 2, memory device 1 and particularly DRAM 2 may not need refresh circuitry and/or the capability to regularly refresh DRAM 2. Otherwise, handshake circuitry 24 may arbitrate between memory access operations to perform and ECC operation, a refresh operation and a normal memory access operation.

It is understood that memory device 1 may utilize any one of a number of different ECC coding schemes, including a standard Hamming code with single error correction and double error detection (SEC/DED).

Built-in self-test (BIST) circuitry is commonly found in integrated circuits to, among other things, identify stuck at faults in the integrated circuit. Conventional BIST circuitry for testing DRAMs cyclically performs read operations and write operations on sequential address locations in the DRAM. As a result, DRAM BIST circuitry typically includes an address register and circuitry for selectively incrementing or decrementing the address register.

Because BIST operations are typically only performed at certain test times, such as at power up or system reset, ECC controller 20 may be configured to perform BIST operations during test times in addition to controlling ECC operations during normal operation. For example, a BIST enable signal, BIST_EN, may be provided to memory device 1 to configure ECC controller 20 to perform either BIST operations on DRAM 2 or ECC operations thereon. In this way, address register 27 and the increment/decrement circuitry corresponding thereto may generate address values for memory access operations during BIST and ECC operations. This exemplary embodiment thereby reduces overhead circuitry.

Relatedly, registers in ECC controller 20 and ECC module 15 may be configurable into one or more serial scan registers to increase the testability of ECC controller 20 and ECC module 15.

It is understood that instead of utilizing dual port DRAM 2, memory device 1 may include other nonvolatile dual port memories, such as a dual port static random access memory (SRAM). In this way, ECC controller 20 and ECC module 15 may check and correct upsets (single event upsets or other upsets) within the nonvolatile memory.

An advantage of memory device 1 is that the ECC operations are separated from a normal memory access operation initiated by an external source, thereby removing ECC circuitry from critical timing paths associated with DRAM 2. In addition, because ECC circuitry is separated from or otherwise disposed outside of DRAM 2, coding circuitry within ECC module 15 may be changed without having to redesign DRAM 2. Further, it is understood that ECC controller and/or ECC module 15 may be used to perform ECC operations with multiple DRAMs or DRAM modules, thereby reducing circuit overhead.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A memory device, comprising:
   a dual port memory having a first port accessible for externally initiated memory access operations and a second port;
   an error module, coupled to the second port of the dual port memory, for performing an error checking operation on words read from the dual port memory via the second port thereof; and
   an error controller coupled to the error module, for controlling the error module to substantially regularly detect errors in each word stored in the dual port memory substantially in parallel with memory access operations operated on the dual port memory via the first port thereof.

2. The memory device of claim 1, wherein the error module cooperates with the error controller to perform an error correction operation on words read from the dual port memory via the second port thereof.

3. The memory device of claim 2, wherein the error module generates a signal to the error controller indicative of whether an error detected by the error module during an error checking operation on a word read from the dual port memory is correctable.

4. The memory device of claim 2, wherein:
   the error module is capable of generating a corrected word of parallel bits for a word read from the dual port memory having at least one correctable error; and
   the error controller, in cooperation with the error module, writes the corrected word into the location in the dual port memory from which the word having the at least one correctable error was previously retrieved.

5. The memory device of claim 1, wherein the error controller provides to the dual port memory addressing and control signals for sequentially reading each word from the dual port memory via the second port thereof, for performing the error checking operation thereon.

6. The memory device of claim 1, further comprising:
a code generation circuit for generating one or more code bits for each group of parallel data provided to the memory device for storage, each group of parallel data and the corresponding one or more code bits being stored in the dual port memory as a word.

7. The memory device of claim 1, further comprising:
a cache coupled to the error module for storing words retrieved from the dual port memory.

8. the memory device of claim 1, further comprising:
a memory controller coupled to the first port of the dual port memory, for accessing the dual port memory from the first port thereof.

9. The memory device of claim 8, wherein:
the error controller alerts the memory controller of the error module determining that a word retrieved from the dual port memory has an uncorrectable error.

10. The memory device of claim 1, wherein the error controller provides to the dual port memory addressing and control signals for sequentially reading each word from the dual port memory via the second port thereof, for performing the error checking operation thereon, the reading occurring substantially continuously.

11. The memory device of claim 1, wherein the dual port memory comprises:
a pair of dual port memories, a first of the dual port memories storing words of data and a second of the dual port memories storing code bits corresponding to the words stored in the first of the dual port memories, the pair of dual port memories being accessed substantially in parallel.

12. The memory device of claim 1, wherein:
the error controller includes circuitry configurable for performing error checking and correcting operations on words retrieved from the dual port memory and performing built-in self-test operations on the dual port memory.

13. The memory device of claim 1, wherein the error module cooperates with the error controller to automatically perform an error correction operation on words retrieved from the dual port memory and having one or more correctable errors.

14. A method of maintaining data, comprising:
performing externally-initiated memory access operations on a memory device via a first port thereof; and
substantially in parallel with performing externally-initiated memory access operations, performing error checking operations on words stored in the memory device via a second port thereof.

15. The method of claim 14, wherein performing error checking operations comprises performing error checking and correcting operations on words stored in the memory device via the second port thereof.

16. The method of claim 15, wherein the checking and correcting operations are performed on each word stored in the memory device.

17. The method of claim 16, wherein the error checking and correcting operations are sequentially performed on the words stored in the memory device.

18. The method of claim 15, wherein:
the error checking and correcting operation generates a corrected word upon detecting a correctable error in a word retrieved from the memory device; and
the method further comprises storing the corrected word in the memory device at a location at which the word retrieved from the memory device having the correctable error was stored.

19. The method of claim 14, further comprising:
following performing an error checking operation on a word stored in the memory device, asserting an error signal indicating whether at least one error was detected.

20. The method of claim 14, further comprising:
following performing an error checking operation on a word stored in the memory device, asserting an error signal indicating whether at least one detected error is correctable.

21. The method of claim 14, wherein:
performing externally-initiated memory access operations include performing memory write operations, each memory write operation including generating one or more code bits for a group of parallel data bits to be written in the memory device, the group of parallel data bits and the corresponding one or more code bits forming a word, and writing the word into the memory device.

22. A memory device, comprising:
a dual port memory device having a first port adapted for performing externally-generated memory access operations, and a second port; and
error checking means for performing error checking operations on words stored in the memory device via a second port thereof substantially simultaneously with the externally-generated memory access operations.

23. The memory device of claim 22, further comprising:
error correction means for performing error correction operations on words identified by the error checking means as having one or more correctable errors.

24. The memory device of claim 22, further comprising:
controller means for controlling the error checking means so that an error checking operations are performed on words sequentially read from the dual port memory.

25. The memory device of claim 22, further comprising:
error correction means for performing error correction operations on words identified by the error checking means as having one or more correctable errors; and
controller means for controlling the error correction means so that a word stored in the dual port memory having a correctable error is replaced by a corrected word generated by the error correction means.

26. The memory device of claim 22, further comprising:
means for generating code bits for each group of parallel data bits to be stored in the memory device via the first port, and forming a word from each group of parallel data bits and corresponding code bits; and
memory controller means for storing in the dual port memory device each word formed by the means for generating code bits via the first port.

27. The memory device of claim 22, wherein:
the error checking means generates a control signal having a value indicative of whether one or more errors in a word stored in the dual port memory device was detected.

28. A memory device, comprising:
a dual port random access memory having a first port from which externally-initiated memory access operations are performed and a second port;
error checking and correcting circuitry, coupled to the second port, for performing error checking and error correction operations on words read from the dual port random access memory via the second port; and an error controller circuit, coupled to the error checking and correcting circuitry and the dual port random access memory, for controlling the error checking and correcting circuitry so as to sequentially perform error checking operations on each word stored in the dual port random access memory, to perform an error correction operation on a word having a correctable error, and to replace the word having a correctable error with a corrected word generated by the error checking and correcting circuitry, the error checking operations being performed substantially simultaneously with externally-initiated memory access operations performed on the dual port random access memory via the first port thereof.

* * * * *